(12) United States Patent
Niemiec et al.

(10) Patent No.: US 10,809,704 B2
(45) Date of Patent: Oct. 20, 2020

(54) PROCESS PERFORMANCE ISSUES AND ALARM NOTIFICATION USING DATA ANALYTICS

(71) Applicant: HONEYWELL INTERNATIONAL INC., Morris Plains, NJ (US)

(72) Inventors: Michael Niemiec, Dexter, MI (US); Viraj Srivastava, Delhi (IN); Greg Stewart, North Vancouver (CA)

(73) Assignee: Honeywell International Inc., Morris Plains, NJ (US)

( * ) Notice: Subject to any disclaimer, the term of this patent is extended or adjusted under 35 U.S.C. 154(b) by 78 days.

(21) Appl. No.: 16/049,372

(22) Filed: Jul. 30, 2018

(65) Prior Publication Data

US 2019/0129395 A1 May 2, 2019

Related U.S. Application Data

(60) Provisional application No. 62/580,296, filed on Nov. 1, 2017.

(51) Int. Cl.
*G06F 19/00* (2018.01)
*G05B 19/418* (2006.01)
*G05B 23/02* (2006.01)
*G05B 15/02* (2006.01)

(52) U.S. Cl.
CPC ..... *G05B 19/41875* (2013.01); *G05B 23/027* (2013.01); *G05B 23/0235* (2013.01); *G05B 23/0272* (2013.01); *G05B 23/0283* (2013.01); *G05B 15/02* (2013.01)

(58) Field of Classification Search
CPC ........................................................ G05B 15/02
USPC ........................................................... 700/108
See application file for complete search history.

(56) References Cited

U.S. PATENT DOCUMENTS

| | | | |
|---|---|---|---|
| 9,270,549 B2* | 2/2016 | Eidelman | H04L 43/08 |
| 9,584,374 B2* | 2/2017 | Bingham | G06F 16/903 |
| 2010/0077077 A1* | 3/2010 | Devitt | H04L 41/147 709/224 |
| 2011/0166912 A1 | 7/2011 | Susumago | |
| 2014/0257545 A1* | 9/2014 | Tanna | G06Q 10/06393 700/108 |
| 2014/0336984 A1* | 11/2014 | Starr | G05B 23/0297 702/183 |
| 2019/0227504 A1* | 7/2019 | Ma | G05B 13/042 |

\* cited by examiner

*Primary Examiner* — Md Azad

(57) ABSTRACT

A method of alarm notification includes providing data for an industrial process including stored alarm event data and stored Key Performance Indicator (KPI) data, and an alarm event-KPI correlation and operator notification system. Patterns of relationships are discovered between the stored alarm event and KPI data to provide a reference pattern database that identifies KPI violation events in the KPI data as a function of the alarm event data or alarm events in the alarm event data as a function of the KPI data. Pattern matching uses a real-time alarm event and real-time KPI data to determine a pattern similarity by comparing a current sequence spanning a predetermined time of the real-time alarm event and KPI data to the patterns. When the pattern matching identifies a current alarm event or KPI violation event, an operator is notified and a predicted KPI value or feature or a predicted alarm event.

10 Claims, 3 Drawing Sheets

PROCESS PERFORMANCE ISSUES AND ALARM NOTIFICATION USING DATA ANALYTICS

CROSS REFERENCE TO RELATED APPLICATIONS

This application claims the benefit of Provisional Application Ser. No. 62/580,296 entitled "PROCESS PERFORMANCE ISSUES AND ALARM NOTIFICATION USING DATA ANALYTICS", filed on Nov. 1, 2017, which is herein incorporated by reference in its entirety.

CROSS-REFERENCE TO COPENDING APPLICATIONS

This application has subject matter related to copending application Ser. No. 15/588,056 entitled "METHODS FOR ANALYTICS-DRIVEN ALARM RATIONALIZATION, ASSESSMENT OF OPERATOR RESPONSE, AND INCIDENT DIAGNOSIS AND RELATED SYSTEMS" that was filed on May 5, 2017.

TECHNICAL FIELD

Disclosed embodiments relate generally to industrial process control and automation systems. More specifically, disclosed embodiments relate to methods and systems for analytics-driven prediction and operator notification of process performance issues and alarms.

BACKGROUND

Industrial alarm systems are often used to maintain plant safety and meet regulatory requirements. An effective alarm system generally communicates indications of abnormal process conditions or equipment malfunctions to plant operators, personnel monitoring and operating industrial processes, or personnel supporting any required response. These alarm systems are embedded in the supervisory control architecture, such as within a distributed control system (distributed control system (DCS)), and the alarms are recorded as discrete events with a time-stamp and other relevant descriptive information such as alarm tag name, alarm type, and area of the plant in the short term history of the process control system.

The operational performance and related economic benefits of the process is generally defined by one or more Key Performance Indicators (KPIs) which is a type of performance measurement that helps one understand process performance. Typically, KPIs are important operating targets or calculated KPI values that are based on a function of process parameters generally initially generated by sensors. Examples of KPI values include process throughput, conversion efficiency, and certain product properties, while a KPI feature is a parameter calculated from a KPI values that can comprise a KPI standard deviation, or a KPI change over a time span. The real-time continuous KPI values are collected and stored in a data historian that also stores process data from sensors which provides long term data storage that is separate from and is not utilized by the process control system (e.g., DCS). Alarm events are either separately stored in the data historian, or are stored in an event tracker which is part of the process control system (e.g., part of the DCS).

SUMMARY

Disclosed embodiments recognize when an operator or other on-site plant personnel of an industrial process control and automation system (hereafter generally referred to as an industrial processing facility (IPF), also known as a 'plant') experiences at least one alarm event, their main focus is generally to understand the current process condition(s) causing the alarm event and then perform a series of corrective actions to resolve the immediate process issue. However, the operators, technicians, engineers, unit managers, and other on-site plant personnel have limited insight into how current alarm events will impact the future performance of the processing unit of the IPF experiencing the process issue, other than relying on their own subjective past experience.

Information contained in known alarm management systems do not contain indicators of process performance such as KPI data comprising KPI values or KPI features since conventional alarm management systems only provide features which are very basic in nature, such as whether the sensor value has violated a configured criteria, such as a high or low safety limit. The KPI information contained in the data historian can show changes in process performance, but does not contain alarm events that were associated with changes in the KPI data. Also, as noted above, the KPI data is stored in a data historian that is separate from and non-accessible by the alarm management system that has an event tracker storing the alarm event data, where the alarm management system is generally part of the DCS.

Disclosed embodiments thus recognize conventional plant alarm systems have problems including lack of information sharing between alarm management system and the data historian having the KPI data. The alarm management system also lacks the ability to analyze the pre- or post-alarm event process behavior. There is believed to be an absence of tools available to analyze the relationship between process performance (e.g., reflected in KPI data) and alarm data. Moreover, there is a lack of a visualization dashboard and/or early warning system to predict future process issues based on current alarm data.

Therefore, there is recognized to be a need to find the relationship between alarm events and the corresponding process performance data, generally indicated by KPI data associated with at least one KPI. Due to this deficiency, there are lost opportunities for operators or other plant personnel to take preemptive corrective actions based on current alarm events to maintain system performance and safety when process issues are only recognized as alarm events as they are occurring.

Disclosed embodiments connect and find the relationship between alarm events and process performance by quantifying the relationships between historical stored alarm event data and stored KPI data generally being KPI violations to predict future process issues to enable taking action to reduce alarm events, provide a notification that enables reducing the time to correct process abnormalities. Reducing the time to correct process abnormalities improves safety, reduces costs, and provides better and more profitable operation of the process units. Also disclosed is the option of including past operator actions into disclosed predicting of future process issues.

Regarding nomenclature as used herein, alarm data includes alarm events and alarm sequences. An alarm event is an event in time triggered in the IPF due to violation of a pre-configured condition(s), generally a process value violating a high or low bound that is configured. An alarm sequence is one or more alarm events that occur within a configured time frame, generally being a collection of related alarm events both in plant location and time frame, i.e. they have to occur in reasonable proximity to each other.

KPI data includes KPI values, KPI features, and KPI violations. KPI values are real-time values calculated or collected from the IPF. KPI features are parameters calculated from KPI values such as a KPI variation, standard deviation, change over a time range, or % change over a time range. A KPI violation event occurs when KPI data (a KPI feature or KPI value) violates a pre-configured limit. This can be a high or low limit on the KPI value or condition on a maximum allowed KPI feature (i.e. when the KPI value moves more than 20 units in 30 minutes or the variation increased by 2 times over the historical baseline) or whatever an engineer deems to be an important measure of process performance.

This Disclosure includes a method of alarm notification that comprises providing data for an industrial process including stored alarm event data and stored KPI data, and an alarm event-KPI correlation and operator notification system. Patterns of relationships are discovered between the stored alarm event data and stored KPI data to provide a reference pattern database that identifies KPI violation events in the stored KPI data as a function of the stored alarm event data or alarm events in the stored alarm event data as a function of the stored KPI data. Pattern matching uses a real-time alarm event and real-time KPI data to determine a pattern similarity by comparing a current sequence spanning a predetermined time of the real-time alarm event and real-time KPI data to the patterns. When the pattern matching identifies a current alarm event or KPI violation event, an operator is notified and a predicted KPI value or KPI feature or predicted alarm event is provided.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
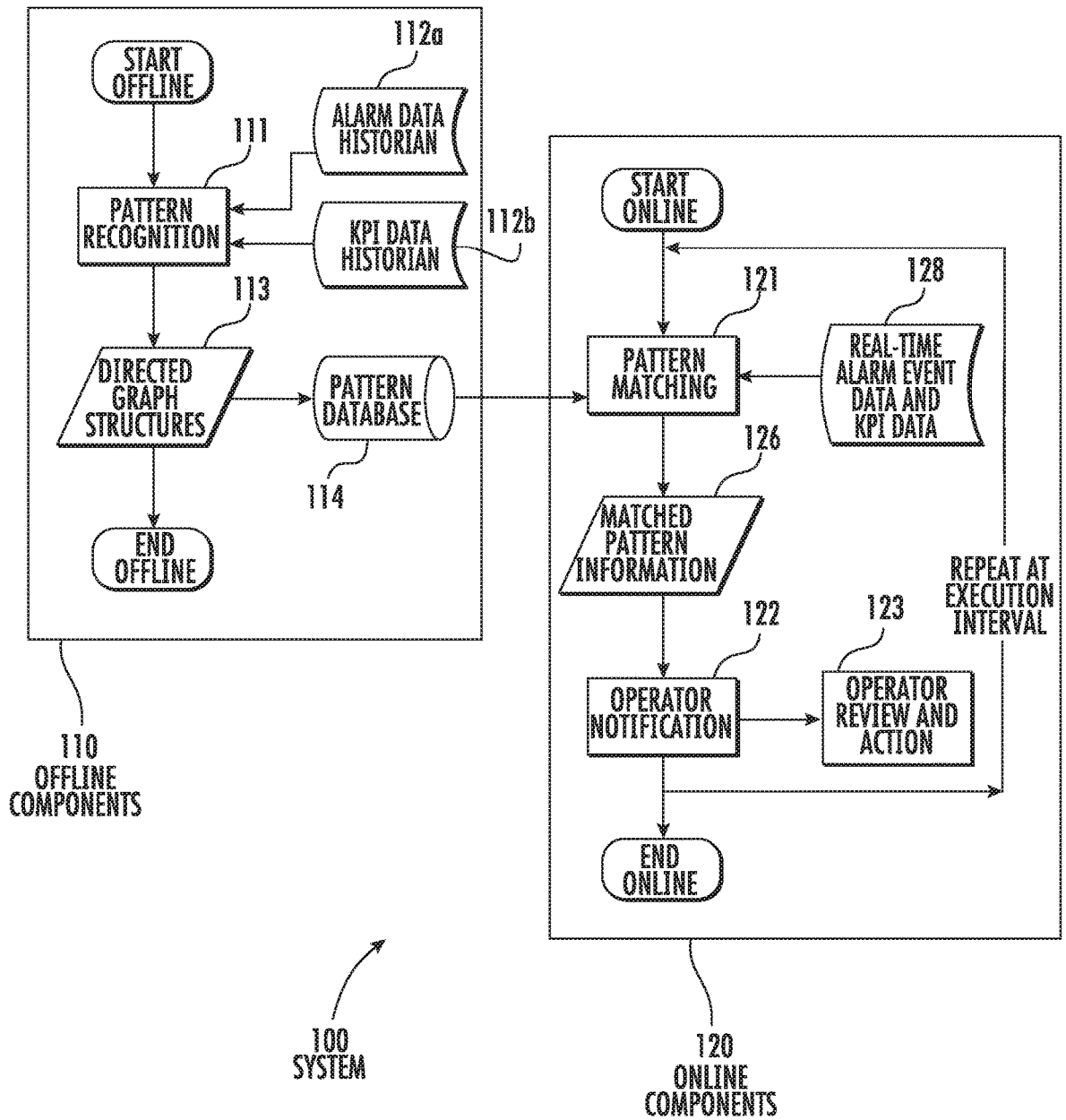
FIG. 1 is a block diagram representation of the data flow and functionality for a disclosed alarm event-KPI data correlation and operator notification system that uses data analytics, according to an example embodiment.

FIG. 1 is a block diagram representation of the data flow and functionality for a disclosed alarm-event KPI correlation and operator notification system 100 that uses data analytics, according to an example embodiment. The implementation of the various system algorithms can be divided as shown in FIG. 1 into offline system components 110 and online system components 120. Offline system components 110 provide offline analysis which comprises pattern matching to model the relationships between stored alarm data and KPI data usually being KPI violations, with the option to also include operator actions as additional data. The offline system components 110 can be used for troubleshooting or root cause analysis, training or advice, or as the basis for online deployment. The online system components 120 provide online deployment where a disclosed model is used in the system 100 that implements predictive process monitoring that provides notifications to the user that predict future process issues to enable taking action to reduce alarm events, and to enable reducing the time to correct process performance abnormalities.

The system 100 is generally realized as a computing device that has stored firmware embodied in a computer program run by a processor of the computing device for implementing a disclosed alarm event-KPI correlation and operator notification system. The processor can comprise a digital signal processor (DSP), a microcontroller, an application specific integrated circuit (ASIC), a general processor, or any other combination of one or more integrated processing devices. However, as known in the art, disclosed alarm event-KPI correlation and operator notification systems may also be implemented by hardware. Regarding hardware-based implementations, algorithm equations can be converted into a digital logic gate pattern, such as using VHDL (a Hardware Description Language) that can then be realized using a programmable device such as a field-programmable gate array (FPGA) or a dedicated application-specific integrated circuit (ASIC) to implement the logic gate pattern. Regarding software-based implementations, code for the algorithm stored in a memory can be implemented by the processor.

Based on information provided to the system 100 including stored alarm event data and stored KPI data, data patterns of relationships between the stored alarm event data and stored KPI data generally being KPI violations as noted above are used to generate a reference pattern database, that together with real-time alarm data and real-time KPI data is used for real-time pattern matching so that current KPI violation events and alarm events can be identified. The pattern matching comprises obtaining a real-time alarm event and real-time KPI data from which a pattern similarity is determined by comparing a current sequence spanning a predetermined time span of the real-time alarm event and real-time KPI data to patterns of relationships in the reference pattern. When the pattern matching identifies a current alarm event or a current KPI violation event, an operator is notified and is provided a predicted KPI value or KPI feature for the current KPI violation event from the real-time alarm data or a predicted alarm event from the current KPI violation event. For example, if a KPI value is predicted to be outside a predetermined limit or range, the operator or other plant personnel may be guided with an automatic notification and a recommendation from the system 100 who then can take appropriate action to resolve the process issues that are caused by the alarm events. It is also possible for the system 100 to also automatically implement recommended corrective action, such as after operator' approval of the proposed corrective action.

Regarding the offline system components 110 of system 100, an initial configuration step will generally occur offline and will typically process stored data comprising both stored alarm data (alarm events and/or alarm sequences) in a DCS historian shown as an alarm data historian 112a and stored KPI data (KPI values, KPI features, and KPI violations) in a process historian shown as a KPI data historian 112b which will be available in one or more data historians that can be in the cloud or on site of the IPF obtained from the same time frame (e.g., the most recent 6 months up to several years). This historical alarm data and KPI data is deemed to sufficiently capture the operational relationships to be discovered by the pattern recognition to be performed by the system 100 in the form of a reference pattern database that includes identified KPI violation events in the stored KPI data as a function of the alarm data or alarm events in the stored alarm data as a function of the stored KPI data. As noted above, operator actions may be additionally used as stored data for predicting of future process issues or recommending corrective actions. The following steps can occur in series to find correlations between the alarm events, operator actions, and KPI data such as KPI violations for the process run by the IPF.

There can also be pre-processing of alarm events (not shown in FIG. 1). For example, the alarm events can be processed to remove nuisance alarm event situations. The nuisance alarm situations include, but are not limited to, chattering and fleeting alarms. Chattering alarms are process variables in alarm two or more times within a user specified time window. A fleeting alarm is an alarm that goes ON and, without the operator acting upon it, goes OFF within a short duration. Rule-based logic may be used to tune timer settings (on-delay time, off-delay time or deadband settings) to remove alarm events deemed to be nuisance alarm events.

FIG. 1 shows the offline system components 110 including a pattern recognition block 111. The pattern recognition block 111 is generally implemented using a multi-step process by considering one or more alarm events and the KPI data, such as KPI values, KPI features or KPI violations. The probability of a KPI violation occurring after a previous alarm event or sequence and the probability of an alarm event or sequence always resulting in a KPI violation are generally calculated for a given context (i.e., time period and plant process). In a similar manner, the probability of an alarm event, or alarm sequence, occurring after a KPI violation and the probability of a KPI violation resulting in an alarm tag or tags can also be calculated.

These results are organized which can be stored in a directed graph structure (see FIG. 2 described below) with alarm events and KPI data descriptors shown as vertices and the probability of occurrence scores as weights on the edges. The KPI data depends on what is important to the user, it could be a change in a KPI value or feature over a set time period or any other defined KPI violation. There can be one or more KPI violation events on the directed graph. Multiple KPI events could be from interacting plan units or multiple KPIs defined for the same plant unit. The graph structure is maintained in a reference database. This pattern recognition can form the basis of an offline study performed by subject matter experts to review and assess the configuration of alarms and KPIs, or can form the basis of the online (real-time) components 120.

The probability of occurrence scores from the KPI-alarm event relationships, and optionally also operator actions, can be calculated as described below. The higher the score, the more likely the events follow each other. The score can be based on the following two calculated factors:
1. Predictability—The probability to predict that if a parent event occurs, one of its child events will follow immediately within a user configured time window. This can be calculated as the percentage of occurrences where the child event follows a parent event using data from the alarm data historian 112a or the KPI data historian 112b.
2. Significance—The probability to predict that when a child event occurs, its parent event has already occurred recently within a user configured time window. This can be calculated as the percentage of occurrences where the parent event precedes a child event using data from alarm data historian 112a or the KPI data historian 112b. As an example, the child event may be a percent decrease in the KPI value for a given precursor parent alarm event. Other combinations may include parent events being alarm frequency or intensity, alarm sequences, KPI violations (high/low/multivariable), KPI anomalies, and child events being an alarm event, alarm frequency or intensity, alarm sequences, and KPI violations (high/low/multivariable).

The score calculations may have tuning handles to help identify the relationships between stored alarm events and stored KPI data in a more effective manner. For alarm events and KPI data, the end user may have the freedom to choose the time window in which the alarm events and KPI data should occur, KPI features, and KPI violation conditions that will define a significant plant event to the operators (e.g., a certain % deviation over the time window or violation of high/low thresholds). These score factors can be considered individually or weighted to find a single score for the KPI-alarm event relationships, such in the example equation for calculating a score as shown below:

$$Score = w_p * Predictability + w_s * Significance$$

where $w_p$ is the user defined weight for the predictability score factor, and $w_s$ is the user' defined weight for the significance score factor. Typically the weights sum to 1, but this is not necessarily required. As with the case of an alarm flood, such as where 10 or more alarms can occur within a minute, the sequence of alarm events can be considered as the alarm event. The alarm event sequence will generally be limited by a user chosen time window in which all the alarm events in the sequence must occur. The scoring will generally be identical to that of the single event case. As described above these results can be organized and stored in a directed graph structure, such as the KPI-alarm directed graph structure 113' shown in FIG. 2 with alarm events and KPIs as vertices and the scores as weights on the edges. The KPI-alarm directed graph structure can be replaced by another structure having scores as a function of alarm events and KPI data, such as an indexed table of grouped events with probabilities (e.g., an EXCEL spreadsheet) stored in the pattern database 114.

The online system components 120 are shown including a pattern matching engine 121 which provides real-time pattern matching, operator notification block 122, and operator review and action 123. The online system components 120 can provide the prediction of KPI data based on alarm data and/or the prediction of alarm data based on one or more KPI data (KPI value, KPI feature, or KPI violation). This is followed by the notification of the operator that process issues are forthcoming. The online system uses designed models compiled by pattern recognition that models the relationships between the alarm events, KPI data (generally offline) and optionally also operator actions in a predictive monitoring system to provide notifications up to the user.

Pattern matching engine 121 is shown receiving data patterns from the pattern database 114 and real-time alarm event data and KPI data 128 from one or more data historians. The alarm event data will generally come from the DCS history and the KPI data will generally come from a data historian such as the Plant Information (PI) or Process History Database (PHD) marketed by Honeywell International. Pattern matching engine 121 generates matched pattern information 126 which is coupled to the operator notification block 122. The pattern matching engine 121 is generally a real-time module that runs on the control system at a prescribed execution frequency, reading the latest alarm data (alarm data can be one or more alarm events) from the control system (e.g., DCS) and KPI data from the process historian.

The current event information shown as real-time alarm event data and KPI data 128 is then processed and matched against the historical patterns stored in the pattern database 114 acting as a reference library in the pattern matching engine 121. If one or more patterns are matched against the current real-time alarm data or real-time KPI data, the patterns will be prioritized based on the calculated reference scores associated with the pattern. This information will be stored in a data structure (not shown, assumed to be the output of matched pattern information 126) along with the affected KPI or alarm event for use in the operator notification block 122.

Regarding operator notification block 122, the operator generally requires a notification of the matched pattern so that they can take corrective action and minimize the event that is pending in the process. The operator will generally utilize a real-time notification mechanism to view the pattern matching results on a suitable display device so that they can take corrective action (e.g., lower the temperature setpoint for a steam boiler) to stabilize process operation. Operator notifications block 122 may take a variety of forms including a visual early warning dashboard or new alarm event (audio and visual). This notification provided can take several forms including a visual dashboard showing the information found in the pattern matching engine and/or triggering another separate alarm event.

Following operator notification 122, there is shown operator review and action block 123. Regarding operator action and review block 123, based on the information provided by the system, the operator can modify the operating parameters of the process (such as changing the steam boiler temperature setpoint) given their training and experience to stabilize operation and/or minimize the effects of the event to maintain safe and profitable performance of the process. As shown in FIG. 1, the online components 120 may be repeated at some execution interval such as 1 min, 5 min, 15 min, which is generally set by how fast the IPF (or unit, or asset) is affected by changes. A slow moving IPF can withstand a longer interval without losing important information. Conversely, a fast moving plant needs a shorter interval to capture relevant information.

Figure 2:
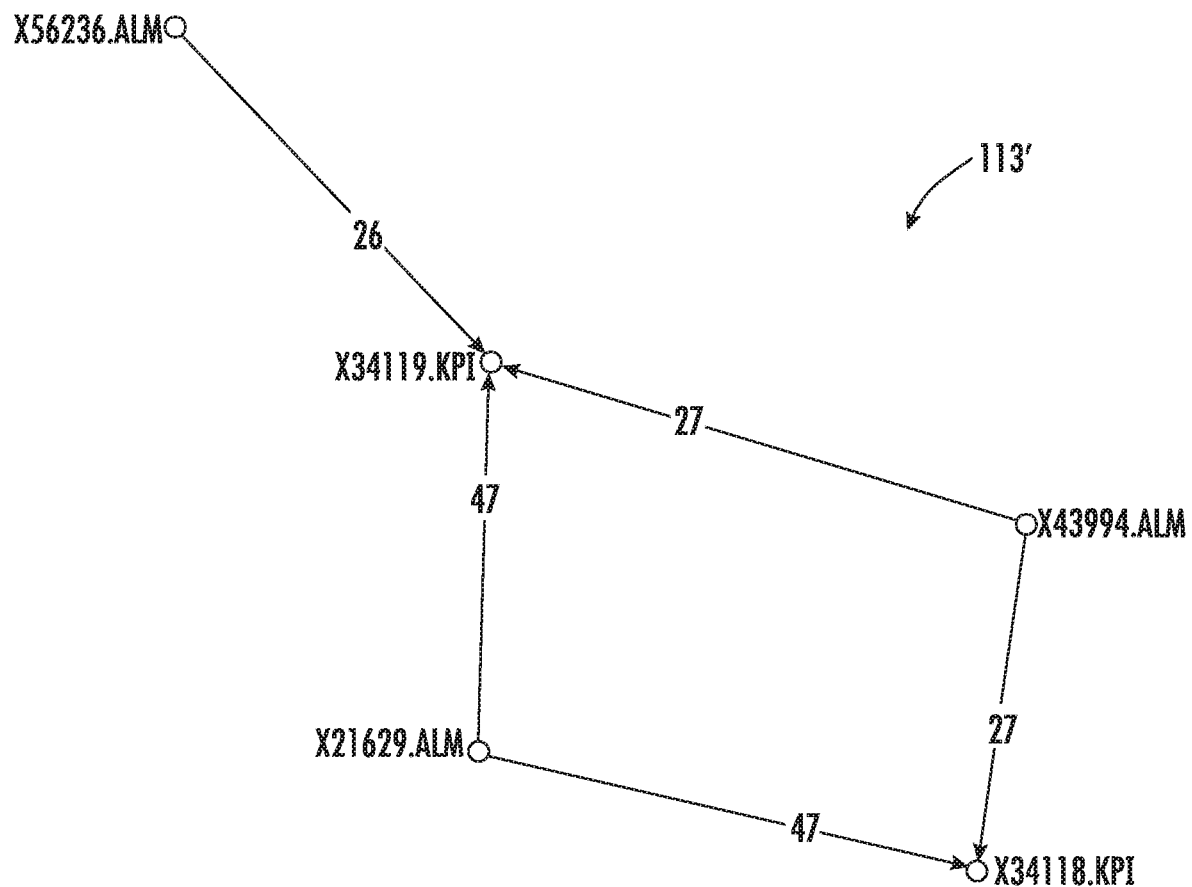
FIG. 2 shows a specific example of a highly simplified alarm event-KPI directed graph structure showing patterns between alarm events and KPI data.

FIG. 2 shows a specific example of an KPI-alarm directed graph structure 113' that shows two KPI violations and 3 alarm events (as ALMs), but can show as little as 1 KPI violation event and 1 alarm event. The text on the nodes are example tag names that have text portions separated by a period, such as the specific alarm event "X56236" shown as "X56236.ALM". Arrows shown indicate the directionality showing which event happened first in time. Colors (not shown) can indicate the event type (KPI violations vs. alarms vs. operator actions (not shown)). The numbers on the line (shows the calculated "score" indicating strength of the relationship (the higher the number, the more likely the alarm events and KPI data are linked). As described above the KPI-alarm directed graph structure 113' (or a generalized directed graph structure 113 shown in FIG. 1) is stored in pattern database 114 which is used by the online system components 120 portion of the alarm event-KPI correlation and operator notification system 100 along with real-time alarm event data and KPI data 128 for pattern matching.

Regarding use of optional operator actions, use of operator action history is now described. The operator action history for disclosed embodiments is generally stored in the alarm data historian 112a that stores the alarm data including the alarm event data. This means that obtaining the alarm events for predictive modeling provides the operator actions at little or no additional effort or expense. The information for an operator action generally includes a time stamp, tag and parameter that was changed, and the beginning and ending value. This information can be used to derive relationship models (patterns) between i) the alarm events and operator actions, ii) KPI data and operator actions, or both i and ii.

When considering prescriptive or advice-giving functionality for the alarm event and operator action case, related actions can be shown to the IPF operator given the current alarm pattern to guide the operator's action in response to the alarm. When considering predictive or warning functionality for the KPI and operator action case, important KPI events can be used directly or predicted from the alarm patterns occurring in the IPF. The related operator actions can be shown to the plant operator for the predicted KPI event. The operator can then use these actions earlier in a preemptive fashion to minimize, and in some cases, eliminate the KPI excursions that have been predicted to occur. In all cases, the presentation of associated operator actions with a pattern would be considered prescriptive information.

Figure 3:
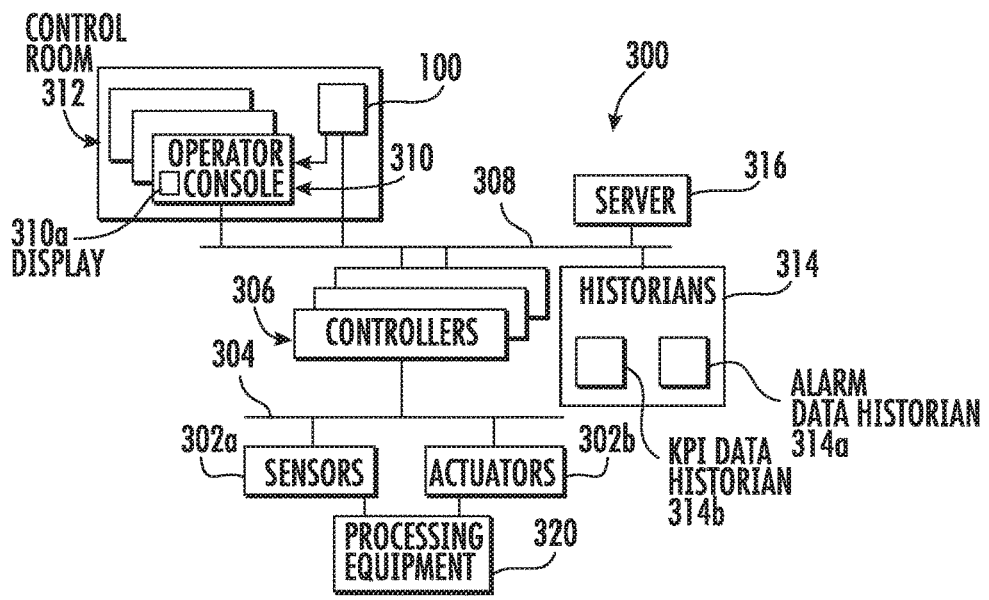
FIG. 3 illustrates an example IPF that includes a disclosed alarm event-KPI correlation and operator notification system in the control room of the IPF, according to an example embodiment.

FIG. 3 illustrates an example IPF 300 that is shown including a disclosed alarm event-KPI correlation and operator notification system 100 in the control room 312. As shown in FIG. 3, the IPF 300 includes various components that facilitate production or processing of at least one tangible product or tangible material. For instance, the IPF 300 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 3, the IPF 300 includes one or more sensors 302a and one or more actuators 302b that are coupled to processing equipment 320. The sensors 302a and actuators 302b represent components in a process control system that may perform any of a wide variety of functions. For example, the sensors 302a could measure a wide variety of characteristics in the process control system, such as pressure, temperature, or flow rate. Also, the actuators 302b could alter a wide variety of characteristics in the process control system. Each of the sensors 302a includes any suitable structure for measuring one or more characteristics in a process control system. Each of the actuators 302b includes any suitable structure for operating on or affecting one or more conditions in a process control system.

At least one network 304 is coupled to the sensors 302a and actuators 302b. The network 304 facilitates interaction with the sensors 302a and actuators 302b. For example, the network 304 could transport measurement data from the sensors 302a and provide control signals to the actuators 302b. The network 304 could represent any suitable network or combination of networks. As particular examples, the network 304 could represent at least one Ethernet network, electrical signal network (such as a Highway Addressable Remote Transducer (HART) network), pneumatic control signal network, or any other or additional type(s) of network(s).

The IPF 300 also includes various controllers 306. The controllers 306 can be used in the IPF 300 to perform various functions in order to control one or more industrial processes. For example, a first set of controllers 306 may use measurements from one or more sensors 302a to control the operation of one or more actuators 302b. A second set of controllers 306 could be used to optimize the control logic or other operations performed by the first set of controllers. A third set of controllers 306 could be used to perform additional functions. The controllers 306 can communicate via one or more networks referred to as buses 308 and associated switches, firewalls, and other components.

Each controller 306 includes any suitable structure for controlling one or more aspects of an industrial process. At least some of the controllers 306 could, for example, represent proportional-integral-derivative (PID) controllers or multivariable controllers, such as controllers implementing model predictive control or other advanced predictive control. As a particular example, each controller 306 could represent a computing device running a real-time operating system, a WINDOWS operating system, or other operating system.

Operator access to and interaction with the controllers 306 and other components of the IPF 300 can occur via various operator consoles 310 that each include a display 310a. Each operator console 310 could be used to provide information to an operator and receive information from an operator. For example, each operator console 310 can provide information identifying a current state of an industrial process to the operator, such as values of various process variables and alarms associated with the industrial process. Each operator console 310 could also receive information affecting how the industrial process is controlled, such as by receiving set points or control modes for process variables controlled by the controllers 306 or other information that alters or affects how the controllers 306 control the industrial process. Each operator console 310 includes any suitable structure for displaying information to and interacting with an operator. For instance, each operator console 310 could represent a computing device running a WINDOWS operating system or other operating system.

Multiple operator consoles 310 can be grouped together and used in one or more control rooms 312. Each control room 312 can include any number of operator consoles 310 in any suitable arrangement. In some embodiments, multiple control rooms 312 can be used to control an industrial plant, such as when each control room 312 contains operator consoles 310 used to manage a discrete part of the IPF 300.

The IPF 300 is also shown including at least one data historian 314 and one or more servers 316. The data historian 314 represents a data storage component that stores various information about the IPF 300 including alarm data historian 314a and KPI data historian 314b. Although not shown, operator action data can also be supplied for alarm event-KPI correlation by bus 308. The data historian 314 could, for instance, store data generated by the various controllers 306 during the control of one or more industrial processes, comprising KPI data in KPI data historian 314b and alarm events in alarm data historian 314a. Accordingly, the IPF 300 that has the data historian 314 that stores the historical alarm event and KPI data being used by the control and automation system (e.g., a DCS) and thus accessible by the alarm event-KPI correlation and operator notification system 100 is distinct from conventional control and automation systems that do not utilize KPI data together with alarm even data.

A disclosed alarm event-KPI correlation and operator notification algorithm will generally reside on a server with knowledge to capture the correct data, either through application programming interfaces (APIs) or open process control (OPC) connections. However, it is also possible to store all data from the process in a cloud-based historian which will reside in the cloud and collect all important process data in one location.

The data historian 314 includes any suitable structure for storing and facilitating retrieval of information. Although shown as a single component here, multiple data historians can be distributed in different locations in the IPF 300 that are each coupled to the bus 308. The data historian 314 can also be located elsewhere in the IPF 300 (such as part of the controller architecture in 306, or a separate application running on a server 316), or in the cloud which can perform the function of extending the bus 308. Each server 316 denotes a computing device that executes applications for users of the operator consoles 310 or other applications. The applications could be used to support various functions for the operator consoles 310, the controllers 306, or other components of the IPF 300. Each server 316 could represent a computing device running a WINDOWS operating system or other operating system.

Various devices shown in FIG. 3 can generate alarms for users, such as when the controllers 306 generate alarms when values of process variables associated with an industrial process are outside of their respective limits. Industrial processes are typically associated with hundreds or thousands of process variables, which can include controlled, manipulated, and disturbance variables. A controlled variable generally denotes a variable whose value can be measured or inferred and that is controlled to be at or near a desired set point or within a desired range. A manipulated variable generally denotes a variable that can be altered in order to adjust one or more controlled variables. A disturbance variable generally denotes a variable whose value can be considered but not controlled when determining how to adjust one or more manipulated variables to achieve desired changes to one or more controlled variables.

Although FIG. 3 illustrates one example of an IPF 300, various changes may be made to FIG. 3. For example, the IPF 300 can include any number of sensors, actuators, controllers, networks, operator stations, control rooms, historians, servers, and other components. Also, the makeup and arrangement of the IPF 300 in FIG. 3 is for illustration only. Components can be added, omitted, combined, further subdivided, or placed in any other suitable configuration according to particular needs. Further, particular functions have been described as being performed by particular components of the IPF 300. This is for illustration only. In general, control and automation systems are highly configurable and can be configured in any suitable manner according to particular needs. In addition, FIG. 3 illustrates one example operational environment where disclosed alarm event-KPI correlation and operator notification can be implemented to provide opportunities for operators or other plant personnel to be notified to enable taking corrective actions based on current (real-time) alarm events as they are occurring to take corrective action to maintain system performance and safety. This functionality can be used in any other suitable control system.

Figure 4:
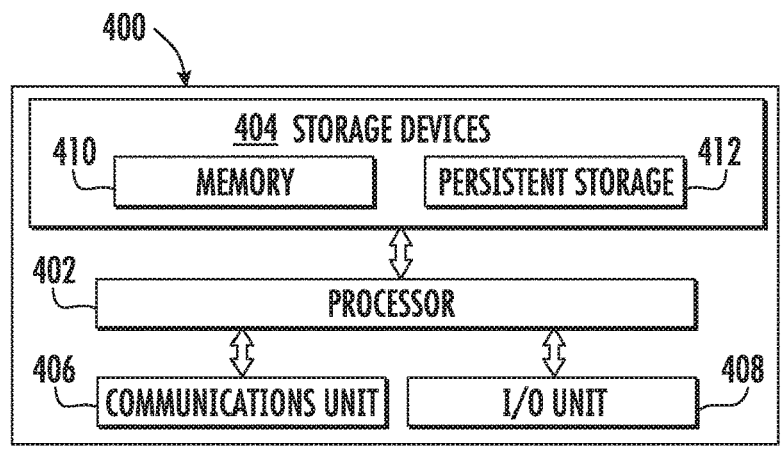
FIG. 4 illustrates an example computing device supporting disclosed alarm event-KPI correlation and operator notification, according to an example embodiment.

FIG. 4 illustrates an example computing device 400 supporting alarm event-KPI correlation and operator notification in an IPF. For ease of explanation, the computing device 400 may be described as being used as the alarm event-KPI correlation and operator notification system 100 in the IPF 300 of FIG. 3. The device 400 can, for example, denote an operator console 310 or a server 316 in FIG. 3. However, the computing device 400 can be used in any other suitable control system.

As shown in FIG. 4, the computing device 400 includes at least one processor 402, at least one storage device 404, at least one communications unit 406, and at least one input/output (I/O) unit 408. Each processor 402 can execute instructions, such as those that may be loaded into a memory 410. The instructions can implement the alarm event-KPI correlation and operator notification functionality described herein. Each processor 402 denotes any suitable processing device, such as one or more microprocessors, microcontrollers, digital signal processors, application specific integrated circuits (ASICs), field programmable gate arrays (FPGAs), or discrete circuitry.

The memory 410 and a persistent storage 412 are examples of storage devices 404, which represent any structure(s) capable of storing and facilitating retrieval of information (such as data, program code, and/or other suitable information on a temporary or permanent basis). The memory 410 may represent a random access memory or any other suitable volatile or non-volatile storage device(s). The persistent storage 412 may contain one or more components or devices supporting longer-term storage of data, such as a read only memory, hard drive, flash memory, or optical disc.

The communications unit 406 supports communications with other systems or devices. For example, the communications unit 406 could include a network interface card or a wireless transceiver facilitating communications over a wired or wireless network (such as the network 308). The communications unit 406 may support communications through any suitable physical or wireless communication link(s).

The I/O unit 408 allows for input and output of data. For example, the I/O unit 408 may provide a connection for user input through a keyboard, mouse, keypad, touchscreen, or other suitable input device. The I/O unit 408 may also send output to a display, printer, or other suitable output device.

Although FIG. 4 illustrates one example of a computing device 400 supporting alarm event-KPI correlation and operator notification in an industrial process control and automation system, various changes may be made to FIG. 4. For example, components could be added, omitted, combined, further subdivided, or placed in any other suitable configuration according to particular needs. Also, computing devices can come in a wide variety of configurations, and FIG. 4 does not limit this application to any particular configuration of computing device.

Figure 5:
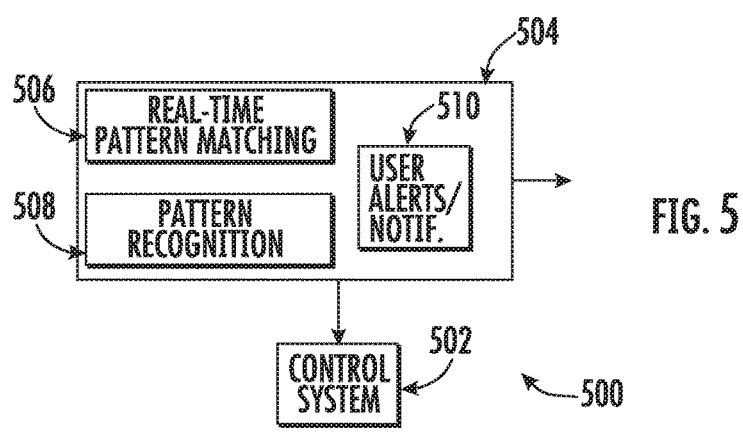
FIG. 5 illustrates an example functional architecture supporting disclosed alarm event-KPI correlation and operator notification, according to an example embodiment.

FIG. 5 illustrates an example functional architecture 500 supporting alarm event-KPI correlation and operator notification in an IPF. For ease of explanation, the architecture 500 may be described as being implemented using the computing device 400 of FIG. 4, in the IPF 300 of FIG. 3. The architecture 500 could, for example, be supported by an operator console 310 or a server 316 in FIG. 3. However, the architecture 500 could be used by any other suitable device and in any other suitable system.

As shown in FIG. 5, the architecture 500 includes or is used in conjunction with a control system 502, which could denote the IPF 300 of FIG. 3 or other IPF. The architecture 500 includes an alarm event-KPI correlation and operator notification tool 504, which generally denotes a software tool or other logic (e.g., digital logic) that is used to process alarm data and KPI data generated from data in the control system 502. For example, the alarm event-KPI correlation and operator notification tool 504 includes functional blocks that support different operations including pattern recognition 506, real-time pattern matching 508, and operator notification shown as user alerts/notification 510.

As described above, disclosed embodiments solve the problem by applying data analytics to integrated alarm data and real-time KPI data, with the option to add operator event data, enabling operator notification for faster response of the operator to process events that can otherwise degrade operational performance and safety. The disclosed solution includes several significant benefits. For offline analytics, identifying the relationship between alarm events (or a sequence of alarms) and key process indicators (e.g., KPIs), finding critical alarm events that affect process performance, finding changes in process performance that trigger alarm events, and identifying or assisting in identifying alarm root causes that produce a cascade of process deviations leading to an eventual reduction in performance indicated by changes in KPI data. For online (real-time) analytics, enabling faster operator reaction times with earlier process performance issue notifications, and helping to maintain high performance and safety through increased operator insight of process behavior.

Numerous variations from disclosed subject matter can be used. There can be different techniques for pattern matching. Besides being based on patterns based on probabilities, Mathematical/machine learning models/techniques can be used to predict the relationships. Such techniques include, but are not limited to, Generalized Sequential Pattern (GSP), Modified Smith-Waterman (MSW), Markov models, Recurrent Neural Networks (RNN), or Temporal Convolution Networks (TCN). Offline prescriptive use can comprise where someone wants to look at best actions for training purposes. For example, given a set of alarm and operator action relationships, the information can be utilized in operator training purposes for either assessing the operators' current actions vs. historical (operator competency) or showing an operator (possibly new or inexperienced on the process unit) how other operators have handled the alarm event. There can be different combinations of predictions. For example, KPI data predicting alarm events, KPI data predicting future values of KPI data, and alarm events predicting future alarm events. Different data sets can be utilized. For example, a case when no operator action data is present (only alarm event(s) and KPI data).

EXAMPLES

Disclosed embodiments of the invention are further illustrated by the following specific Examples, which should not be construed as limiting the scope or content of this Disclosure in any way.

This Example describes one set of data requirements for an alarm event-KPI correlation and operator notification system. The first data category is historical alarm event data comprising process alarms, operator process changes, system alarms, and system status. The second data category is process data presented in the form of KPI data obtained from the process data. A KPI can as noted above comprises a calculated parameter which can be a combination of process and gathered parameters such as a cost stream (Flowrate [volume/time]*Price [$/volume]). However, a KPI may commonly be equal to a process value such an output steam concentration. Furthermore, KPI features can be calculated based on the KPI value such as variation, standard deviation, change over a time range, and percent change over a time range. One can request KPI data from the same IPF for the same time range as the above alarm event data. The KPI data can be anything from Process Variable (PV) values themselves to calculated economic or performance measures, from small assets (e.g., pumps, or valves) to the unit level. Raw continuous data (setpoint (SP), controller's output (OP), PV)) is also obtained from which KPIs may be calculated from. A description of important process parameters/calculations is generally used and/or engineering configurations.

Regarding data frequency, the alarm event-KPI correlation and operator notification system can use the default frequency with which the IPF is recording data. It is generally preferred if all events (both alarms and operator changes) are captured. The amount historical data can be a minimum of 1 (continuous) process unit, multiple units being preferred. Regarding the data utilized, 6 months of data or 150,000 to 200,000 rows of data is recommended, or if not possible, as much data as is available.

While this Disclosure has described certain embodiments and generally associated methods, alterations and permutations of these embodiments and methods will be apparent to those skilled in the art. Accordingly, the above description of example embodiments does not define or constrain this Disclosure. Other changes, substitutions, and alterations are also possible without departing from the spirit and scope of this Disclosure, as defined by the following claims.

The invention claimed is:

1. A method, comprising:
providing historical process data for an industrial process run by an industrial processing facility (IPF) having processing equipment including stored data including stored alarm event data and stored Key Performance Indicator (KPI) data for at least one KPI, and a processor implementing an alarm event-KPI correlation and operator notification system, said system:
discovering patterns including relationships between said stored alarm event data and said stored KPI data to provide a reference pattern database that identifies KPI violation events in said stored KPI data as a function of said stored alarm event data or alarm events in said stored alarm event data as a function of said stored KPI data;
pattern matching, wherein a real-time alarm event and real-time KPI data obtained from said industrial process are read and a pattern similarity is determined by comparing a current sequence spanning a predetermined time span of said real-time alarm event and said real-time KPI data to said patterns of relationships in said reference pattern database,
when said pattern matching identifies a current alarm event or a current KPI violation event, notifying an operator and providing a predicted KPI value or KPI feature for said current KPI violation event from said real-time alarm event or a predicted alarm event from said current KPI violation event, and
wherein said predicted KPI value or KPI feature is provided, and when said predicted KPI value or KPI feature is determined to be violating a predetermined limit, range or condition, automatically generating a notification including a recommendation for implementing a corrective action to at least one piece of said processing equipment to stabilize operation of said industrial process.

2. The method of claim 1, wherein said reference pattern database includes a directed graph structure with said stored alarm event data and said stored KPI data as vertices with a probability of occurrence as weights on edges of said directed graph structure.

3. The method of claim 1, wherein said stored data further includes historical operator actions, wherein said discovering patterns further comprises utilizing said historical operator actions with at least one of said stored alarm event data and said stored KPI data to discover additional said patterns, and wherein said pattern matching comprises matching said real-time alarm events or said real-time KPI data to one of said additional patterns to provide suggestions of past ones of said historical operator actions based on said additional patterns.

4. The method of claim 1, wherein said pattern matching is performed offline.

5. The method of claim 1, wherein said pattern matching is performed online, and wherein said pattern matching is implemented in an online warning system as an audio or visual alert.

6. A computing device, comprising:
a processor having an associated memory configured for implementing an alarm event-Key Performance Indicator (KPI) correlation and operator notification system that supports an industrial process run by an industrial processing facility (IPF) having processing equipment, said operator notification system implementing:
discovering patterns including relationships between stored alarm event data and stored KPI data to provide a reference pattern database that identifies KPI violation events in said stored KPI data as a function of said stored alarm event data or alarm events in said stored alarm event data as a function of said stored KPI data;
pattern matching, wherein a real-time alarm event and a real-time KPI data obtained from said industrial process are read and a pattern similarity is determined by comparing a current sequence spanning a predetermined time span of said real-time alarm event and said real-time KPI data to said patterns of relationships in said reference pattern database,
when said pattern matching identifies a current alarm event or a current KPI violation event, notifying an operator and providing predicted KPI value or KPI feature for said current KPI violation event from said real-time alarm event or a predicted alarm event from said current KPI violation event, and
wherein said predicted KPI value or KPI feature is provided, and when said predicted KPI value or KPI feature is determined to be violating a predetermined limit, range or condition, automatically generating a notification including a recommendation for implementing a corrective action to at least one piece of said processing equipment to stabilize operation of said industrial process.

7. The device of claim 6, wherein said reference pattern database includes a directed graph structure with said stored alarm event data and said stored KPI data as vertices with a probability of occurrence as weights on edges of said directed graph structure.

8. The device of claim 6, wherein stored data further includes historical operator actions, wherein said discovering patterns further comprises utilizing said historical operator actions with at least one of said stored alarm event data and said stored KPI data to discover additional said patterns, and wherein said pattern matching comprises matching said real-time alarm events or said real-time KPI data to one of said additional patterns to provide suggestions of past ones of said historical operator actions based on said additional patterns.

9. The device of claim 6, wherein said pattern matching is performed offline.

10. The device of claim 6, wherein said pattern matching is performed online, and wherein said pattern matching is implemented in an online warning system as an audio or visual alert.

* * * * *